United States Patent
Newman et al.

(10) Patent No.: US 11,777,639 B2
(45) Date of Patent: Oct. 3, 2023

(54) HOW TO MAXIMIZE PHASE-NOISE MARGINS IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: ULTRALOGIC 6G, LLC, Palos Verdes, CA (US)

( * ) Notice: Subject to any disclaimer, the term of this patent is extended or adjusted under 35 U.S.C. 154(b) by 0 days.

(21) Appl. No.: 18/127,760

(22) Filed: Mar. 29, 2023

(65) Prior Publication Data

US 2023/0231645 A1    Jul. 20, 2023

Related U.S. Application Data

(63) Continuation of application No. 17/947,705, filed on Sep. 19, 2022, now Pat. No. 11,637,649.

(60) Provisional application No. 63/403,924, filed on Sep. 6, 2022.

(51) Int. Cl.
*H04L 1/00* (2006.01)
*H04L 25/03* (2006.01)

(52) U.S. Cl.
CPC ...... *H04L 1/0003* (2013.01); *H04L 25/03006* (2013.01)

(58) Field of Classification Search
CPC .................. H04L 1/0003; H04L 25/03006
See application file for complete search history.

(56) References Cited

U.S. PATENT DOCUMENTS

| | | |
|---|---|---|
| 5,828,695 A | 10/1998 | Webb |
| 10,212,020 B2 | 2/2019 | Kwon |
| 11,387,935 B2 | 7/2022 | Newman |
| 11,398,876 B2 | 7/2022 | Newman |
| 2002/0114379 A1 | 8/2002 | Uesugi |
| 2004/0066844 A1* | 4/2004 | Moon ................ H04L 27/3488 375/264 |

(Continued)

FOREIGN PATENT DOCUMENTS

WO    WO-2022249033 A1 * 12/2022 ............... H04L 5/00

*Primary Examiner* — Vineeta S Panwalkar

(57) ABSTRACT

Enhanced phase-noise mitigation is possible at low-to-no cost. Communication at the high frequencies envisioned for late 5G and 6G will require much better phase-noise control than current frequency bands, because the tight margins will result in excessive phase faults and greatly reduced throughput. The disclosed examples show how to use two modulation schemes to provide the best phase margins at the final step. For example, the message can be initially modulated in classical amplitude-phase modulation as transmitted, but is received and processed using convenient QAM orthogonal components. Then the receiver can convert the results back to the amplitude-phase modulation scheme analytically, and can finally demodulate using calibrated amplitude and phase levels derived from a proximate demodulation reference. Since the amplitude-phase modulation scheme provides substantially larger phase margins than QAM with the same information content, substantially higher frequencies can be accessed while retaining high reliability.

18 Claims, 7 Drawing Sheets

(56) References Cited

U.S. PATENT DOCUMENTS

| | | |
|---|---|---|
| 2004/0114692 A1 | 6/2004 | Matsumoto |
| 2008/0112509 A1 | 5/2008 | Bock |
| 2011/0305457 A1 | 12/2011 | Kikuhi |
| 2012/0281988 A1 | 11/2012 | Kikuchi |
| 2017/0310528 A1* | 10/2017 | Hui .................. H04L 27/3488 |
| 2018/0034678 A1 | 2/2018 | Montorsi |
| 2019/0044672 A1 | 2/2019 | Hernando |
| 2020/0220763 A1 | 7/2020 | Montorsi |
| 2021/0126662 A1 | 4/2021 | Solichien |
| 2021/0288863 A1 | 9/2021 | Shah |
| 2021/0368539 A1 | 11/2021 | Zewail |
| 2022/0123825 A1 | 4/2022 | Mehrabani |
| 2022/0141064 A1 | 5/2022 | Horn |
| 2022/0231900 A1 | 7/2022 | Newman |

* cited by examiner

FIG. 9A

901 - DETERMINE A MODULATION SCHEME WITH Namp AMPLITUDE LEVELS AND TWO PHASE LEVELS (AN I-BRANCH AND A Q-BRANCH), SEPARATED BY 90 DEGREES. THE AMPLITUDE LEVELS ARE EQUALLY SPACED APART, AND INCLUDE AN EQUAL NUMBER OF POSITIVE AND NEGATIVE AMPLITUDE LEVELS.

902 - MODULATE A MESSAGE ACCORDING TO THE PHASE AND AMPLITUDE LEVELS, SETTING THE Q-BRANCH AMPLITUDE EQUAL TO THE I-BRANCH AMPLITUDE FOR EACH MESSAGE ELEMENT. MAKE USE OF ALL OF THE POSITIVE AND NEGATIVE AMPLITUDE LEVELS OF THE MODULATION SCHEME.

903 - TRANSMIT THE MESSAGE.

FIG. 9B

921 - RECEIVE A MESSAGE.

922 - FOR EACH MESSAGE ELEMENT, MEASURE AN I-BRANCH AMPLITUDE AND A Q-BRANCH AMPLITUDE.

923 - CALCULATE A SUM-SIGNAL AMPLITUDE FROM THE I AND Q AMPLITUDES.

924 - SET THE SIGN ACCORDING TO THE LARGER OF THE I AND Q AMPLITUDES.

925 - DETERMINE CLOSEST SUM-SIGNAL AMPLITUDE LEVEL OF MODULATION SCHEME.

FIG. 9C

941 - CALCULATE SUM-SIGNAL AMPLITUDE AND PHASE FROM I AND Q AMPLITUDES.

942 - IS PHASE IN EXCLUDED ZONE? (N / Y)

943 - IS AMPLITUDE IN EXCLUDED ZONE? (N / Y)

944 - ELEMENT IS DEMODULATED OK.

945 - ELEMENT IS FAULTED.

HOW TO MAXIMIZE PHASE-NOISE MARGINS IN 5G AND 6G

PRIORITY CLAIMS AND RELATED APPLICATIONS

This application is a continuation of U.S. patent application Ser. No. 17/947,705, entitled "Phase-Noise Mitigation at High Frequencies in 5G and 6G", filed Sep. 19, 2022, which claims the benefit of U.S. Provisional Patent Application Ser. No. 63/403,924, entitled "Phase-Noise Mitigation at High Frequencies in 5G and 6G", filed Sep. 6, 2022, all of which are hereby incorporated by reference in their entireties.

FIELD OF THE INVENTION

The disclosure pertains to phase-noise mitigation in wireless messaging, and particularly to phase-noise mitigation at high frequencies.

BACKGROUND OF THE INVENTION

Wireless communication at very high frequencies, such as tens to hundreds of GHz, is needed for the massively increased demand in bandwidth and throughput expected in 5G and 6G. However, phase noise is an increasing problem at higher frequencies, preventing full usage of the bandwidth for messaging. What is needed is means for mitigating the phase noise so that the promise of high-speed messaging at high frequencies can be at least partially realized.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a wireless receiver to demodulate a message, the method comprising: using a first modulation scheme comprising two multiplexed modulation parameters and integer Nstate allowed modulation states, each allowed modulation state comprising a predetermined combination of the two multiplexed modulation parameters; determining one or more acceptance regions comprising combinations of the two multiplexed modulation parameters, wherein each acceptance region contains exactly one of the allowed modulation states; receiving a message comprising message elements, each message element comprising a raw signal; demodulating each message element according to the first modulation scheme; determining whether the message element, as demodulated, is within one of the acceptance regions; when the message element, as demodulated, is within a particular acceptance region, assigning the message element to the allowed modulation state contained in the particular acceptance region; and when the message element, as demodulated, is not within any of the acceptance regions, determining that the message element is faulted.

In another aspect, there is a method for a wireless transmitter to transmit a message, the method comprising: using a modulation scheme comprising integer Nstate allowed modulation states, each allowed modulation state comprising amplitude modulation multiplexed with phase modulation, wherein the amplitude modulation comprises integer Namp predetermined amplitude levels and the phase modulation comprises integer Nphase predetermined phase levels; wherein the Namp predetermined amplitude levels are equally spaced apart according to an amplitude step, and the Nphase predetermined phase levels are equally spaced apart according to a phase step; modulating each message element of a message according to the modulation scheme; and transmitting the message.

In another aspect, there is non-transitory computer-readable media in a wireless receiver, the media containing instructions that when implemented in a computing environment cause a method to be performed, the method comprising: receiving a wireless message comprising message elements, each message element modulated according to a first modulation scheme, the first modulation scheme comprising a first plurality of modulation states, wherein each modulation state of the first plurality comprises a first modulation parameter multiplexed with a second modulation parameter; for each message element, demodulating the message element according to a second modulation scheme comprising a second plurality of modulation states, wherein each modulation state of the second plurality comprises a third modulation parameter multiplexed with a fourth modulation parameter, wherein the third and fourth modulation parameters differ from the first and second modulation parameters; for each message element, converting the third and the fourth modulation parameters into the first and second modulation parameters, according to an algorithm; and then demodulating each message element by determining which modulation state of the first plurality comprises modulation parameters that are closest to the first and second modulation parameters of the message element.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 9A is a flowchart showing an exemplary embodiment of a procedure for transmitting a message with phase-noise mitigation, according to some embodiments.

FIG. 9B is a flowchart showing an exemplary embodiment of a procedure for receiving a message with phase-noise mitigation, according to some embodiments.

FIG. 9C is a flowchart showing an exemplary embodiment of a procedure for determining whether a message with phase-noise mitigation is faulted, according to some embodiments.

Like reference numerals refer to like elements throughout.

DETAILED DESCRIPTION

Figure 1A:
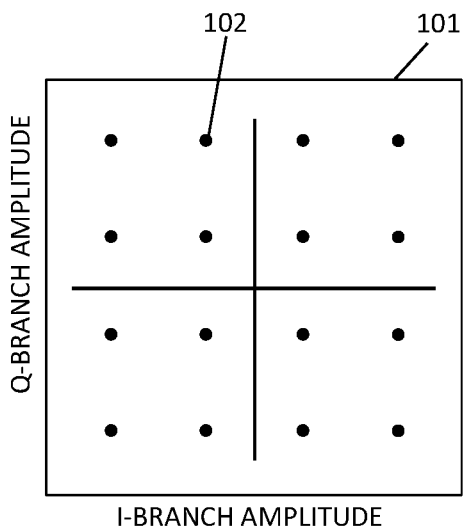
FIG. 1A is a schematic showing an exemplary embodiment of a 16QAM constellation chart, according to prior art.

Systems and methods disclosed herein (the "systems" and "methods", also occasionally termed "embodiments" or "arrangements" or "versions" or "examples", generally according to present principles) can provide urgently needed wireless communication protocols for mitigating the effects of phase noise at high frequencies planned for late 5G and 6G communications. For example, a message can be modulated according to a modulation scheme that provides a large phase acceptance region around each allowed modulation state, thereby accommodating a high level of phase noise without demodulation faults. Modulation schemes providing large phase acceptance regions are disclosed, including specific quadrature schemes in which each allowed state has equal amplitude modulation in its two orthogonal branches. By excluding states without the equal-amplitude restriction, such modulation schemes can provide unambiguous demodulation of each allowed state, even with high levels of phase noise. In addition, failure-mode diagnostics are disclosed for specifically identifying amplitude errors, phase errors, and combined errors, thereby indicating which other modulation scheme would reduce the observed error types.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "subchannel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Classical" amplitude-phase modulation refers to message elements modulated in both amplitude and phase, whereas "quadrature" or "PAM" (pulse-amplitude)

modulation refers to two signals, separately amplitude-modulated, and then multiplexed and transmitted with a 90-degree phase shift between them. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. QPSK is phase modulated but not amplitude modulated. 16QAM may be modulated according to PAM which exhibits two phase levels at zero and 90 degrees (or in practice, for carrier suppression, ±45 degrees) and four amplitude levels including two positive and two negative amplitude levels, thus forming 16 distinct modulation states. For comparison, classical amplitude-phase modulation in 16QAM includes four positive amplitude levels and four phases of the raw signal, which are multiplexed to produce the 16 states of the modulation scheme. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal.

In addition to the 3GPP terms, the following terms are defined herein. Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. A "demodulation reference" is a set of Nref modulated "reference resource elements" or "reference elements" modulated according to the modulation scheme of the message and configured to exhibit levels of the modulation scheme (as opposed to conveying data). Thus integer Nref is the number of reference resource elements in the demodulation reference. A "calibration set" is one or more amplitude values (and optionally phase values), which have been determined according to a demodulation reference, representing the predetermined modulation levels of a modulation scheme. A "short-form" demodulation reference is a demodulation reference that exhibits the maximum and minimum amplitude levels of the modulation scheme, from which the receiver can determine any intermediate levels by interpolation. "RF" or radio-frequency refers to electromagnetic waves in the MHz (megahertz) or GHz (gigahertz) frequency ranges. The "raw" signal is the as-received waveform before separation of the quadrature branch signals. "Phase noise" is random noise or time jitter that alters the phase of a received signal, usually without significantly affecting the overall amplitude. "Phase-noise tolerance" is a measure of how much phase alteration can be imposed on an allowed state without causing a demodulation fault. A "faulted" message has at least one incorrectly demodulated message element. A "phase fault" is a message element demodulated as a state differing in phase from the intended modulation state, whereas an "amplitude fault" is a message element demodulated as a state differing in amplitude from the intended modulation state.

Referring to quadrature or PAM modulation, an "I-Q" space is an abstract two-dimensional space defined by an I-branch amplitude and an orthogonal Q-branch amplitude, in which each transmitted message element occupies one of several predetermined I-Q states of a modulation scheme. When the orthogonal branches are called "real" and "imaginary", the I-Q space is sometimes called the "complex plane". The I and Q branches are "equal" if their amplitudes are equal in both sign and magnitude (such as both I and Q being −6 units), whereas the I and Q branches are "equal in magnitude" if a magnitude of the I-branch amplitude equals a magnitude of the Q-branch amplitude (such as I of +6 and Q of −6 units), and are "equal in sign" if the I-branch and the Q-branch have the same sign. The examples disclosed below involve modulation states in which the branch amplitudes are equal in magnitude, equal in sign and magnitude, or positive and equal in magnitude, for various embodiments providing various levels of phase-noise tolerance.

The receiver may process the received signals by determining a "sum-signal", which is the vector sum of the I and Q branch signals. A vector sum is a sum of two vectors, in this case representing the amplitudes and phases of the two orthogonal branches in I-Q space. The sum-signal has a "sum-signal amplitude", equal to the square root of the sum of the I and Q branch amplitudes squared (the "root-sum-square" of I and Q), and a "sum-signal phase", equal to the arctangent of the ratio of the I and Q signal amplitudes (plus an optional base phase, ignored herein). When the message element is received at a receiver, the I and Q amplitudes may be substantially different from the transmitted values due to phase noise, which generally intermingles the two branches. Phase noise tends to change the ratio of I and Q amplitudes, but does not tend to change the overall amplitude of the message element, absent amplifier nonlinearities which are ignored herein. Therefore, the receiver can correctly demodulate the message element by calculating the sum-signal amplitude and sum-signal phase. For example, the receiver can determine whether the sum-signal amplitude and phase are within certain predetermined regions, termed "phase acceptance regions" around each allowed state in the I-Q space. Each phase acceptance region includes a range of sum-signal amplitude values and a range of sum-signal phase values. (The receiver can alternatively determine the phase acceptance regions as a range of I-branch and Q-branch amplitudes, but the sum-signal method is simpler and more precise.) If the received sum-signal is outside the phase acceptance regions, the receiver can flag the message element as faulted. If the received sum-signal is consistent with some other state's acceptance region, due to noise, then the message will be incorrectly demodulated.

Turning now to the figures, a prior-art modulation scheme is susceptible to phase noise at high frequencies.

FIG. 1A is a schematic showing an exemplary embodiment of a 16QAM constellation chart, according to prior art. As depicted in this prior-art example, a modulation scheme 101 includes 16 allowed modulation states 102, each allowed state determined by an I-branch signal and a Q-branch signal orthogonal to the I-branch signal (for example, the Q-branch phase-modulated at 90 degrees relative to the I-branch). The horizontal axis shows the amplitude modulation of the I-branch signal, and the vertical axis shows the amplitude modulation of the Q-branch signal, each branch being amplitude-modulated at one of certain predetermined amplitude levels of the modulation scheme. In this case, the predetermined amplitude levels are −3, −1, +1, and +3 arbitrary units. The various amplitude levels are equally separated and symmetrical around zero. The central cross-shape represents zero amplitude. Negative amplitude levels are equivalent to a 180-degree phase change. There are 16 states, as expected for 16QAM. A receiver can receive a message element modulated according to this modulation scheme, and can extract the I and Q branches separately by analog or digital signal-processing means. The receiver can then measure the amplitudes of those two branches, compare the measured amplitude values to a predetermined set of amplitude levels, select the closest match to each branch amplitude, and thereby determine the modulation state of the message element. 16QAM encodes 4 bits per message element.

Figure 1B:
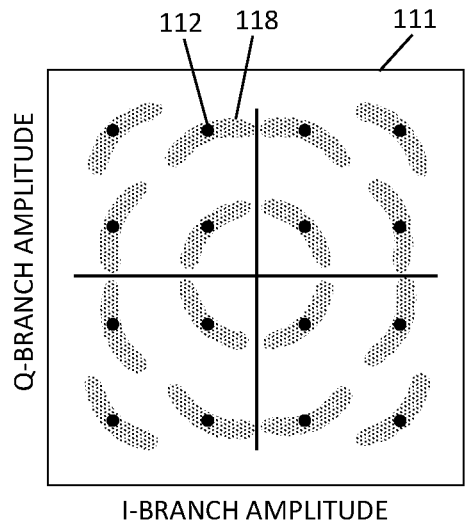
FIG. 1B is a schematic showing an exemplary embodiment of the effect of phase noise on a 16QAM constellation chart, according to prior art.

FIG. 1B is a schematic showing an exemplary embodiment of the effect of phase noise on a 16QAM constellation chart, according to prior art. As depicted in this prior-art example, the modulation states 112 of a 16QAM constellation chart 111 can be distorted ("smeared out") by phase noise in a characteristic way as indicated by phase distortion clouds 118. The depicted distortions would be caused by moderate phase noise at moderate frequencies; at high frequencies it is much worse. If the same modulation scheme were attempted at the much higher frequencies planned for future wireless operation, the phase noise would be much larger than depicted, and the phase-noise clouds would substantially overlap, resulting in frequent message faults. Hence the need for strategies to enable communication despite strong phase distortions.

Figure 2A:
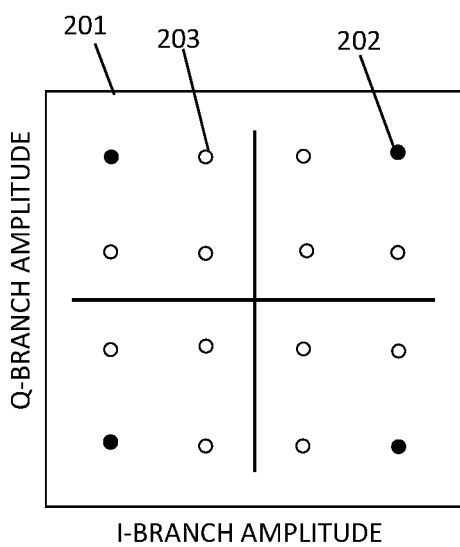
FIG. 2A is a schematic showing an exemplary embodiment of a phase-noise mitigation constellation chart emphasizing maximum amplitude, according to some embodiments.

FIG. 2A is a schematic showing an exemplary embodiment of a constellation chart for phase-noise mitigation emphasizing maximum amplitude, according to some embodiments. As depicted in this non-limiting example, a constellation chart 201 of an I-Q space includes, as the allowed modulation states, only the four states 202 (filled dots) in which the I and Q branches have equal amplitudes in magnitude, and wherein both branches are modulated at the largest branch amplitude level. All the other states 203 of 16QAM, which do not have equal-in-magnitude branch modulation at the maximum level, are disallowed states 203 (circles). The four allowed modulation states 202 have the maximum magnitude in both the I and Q branches (that is, ±3 arbitrary units in both branches, in the present example). The allowed states 202 therefore have a larger sum-signal amplitude (4.2 arbitrary units) than any of the disallowed states 203 (ranging from 1.4 to 3.2 arbitrary units). The allowed states 202 thereby provide a much larger phase-noise tolerance than the prior-art states 102, and may be used for messaging at higher frequencies where the prior-art scheme of FIG. 1A would fail, according to some embodiments.

It may be noted that high-frequency operation does not come without a price. In the disclosed examples, that price is a reduction in the number of allowed modulation states, relative to prior-art schemes that lack phase-noise mitigation. The restricted number of allowed states reduces the number of bits per message element, and results in longer messages for the same amount of information transfer. For example, in the case shown, there are 4 allowed states instead of the original 16, and the information-carrying capacity is 2 bits per message element with phase-noise mitigation, instead of 4 bits per message without the mitigation. Hence any message modulated according to the modulation scheme 201 will be twice as long as one modulated according to FIG. 1A. On the other hand, the modulation scheme of FIG. 2A enables communication at much higher frequencies, thereby opening up new high-frequency bandwidths that are inaccessible to the prior-art scheme, due to excessive phase noise. In many cases, the reduced information density is an acceptable price for reliable communication at the higher frequencies. (The information density can be at least partially restored by adding amplitude levels or tailoring the constellation chart states, as discussed below.)

Figure 2B:
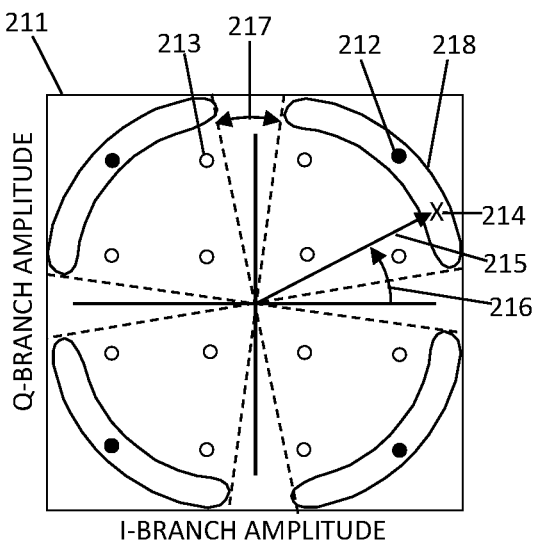
FIG. 2B is a schematic showing an exemplary embodiment of a phase-noise mitigation constellation chart emphasizing maximum amplitude and including phase acceptance regions, according to some embodiments.

FIG. 2B is a schematic showing an exemplary embodiment of a phase-noise mitigation constellation chart emphasizing maximum amplitude and including phase acceptance regions, according to some embodiments. As depicted in this non-limiting example, an I-Q space representing a modulation scheme 211, such as that of FIG. 2A, includes four allowed states 212, wherein each state's I and Q amplitudes are equal in magnitude, and are modulated according to the largest amplitude level of the modulation scheme. Also shown are various disallowed states 213 of 16QAM. Each allowed state 212 is surrounded by a phase acceptance region 218 which indicates the region of the I-Q space that will be demodulated as the associated allowed state. Any received message element, distorted by phase noise but remaining in the phase acceptance region 218, will be demodulated as the associated allowed state 212, thereby mitigating the effects of phase noise. As mentioned, phase noise tends to change the sum-signal phase without significantly altering the sum-signal amplitude. By providing a large phase acceptance region 218, not overlapping or even contacting the phase acceptance regions of other allowed states, the modulation scheme can enable correct demodulation of message elements while avoiding phase faults, even in the high phase-noise environment of a high-frequency transmission where other schemes, lacking such mitigation, would fail. Thus the modulation scheme of FIG. 2A or 2B may be used to access much higher frequency regions than the prior-art schemes such as FIG. 1A, according to some embodiments.

Operationally, the receiver can receive each message element of a message, and can separate the I and Q branches, and can measure the amplitudes of those two branches. The receiver can then calculate a sum-signal amplitude and a sum-signal phase based on the received I and Q amplitudes, and can then determine whether the sum-signal is in one of the phase acceptance regions 218. If so, the receiver can assign the message element to the associated allowed state 212. If not, the receiver can flag the message element as likely faulted.

The receiver can calculate the sum-signal amplitude as the square root of the sum of the squares of the branch amplitudes, and the sum-signal phase as the arctangent of the Q/I ratio. On the figure, a particular received message element is indicated as an "x" 214, the associated sum-signal amplitude as a radial vector 215, and the sum-signal phase as a polar angle 216. The received message element 214 is within the phase acceptance region 218 and therefore would be demodulated as the associated allowed state 212.

Normally, a receiver determines a set of predetermined amplitude levels of the modulation scheme from a previous or concurrent demodulation reference. Upon receiving the message, the receiver can then compare the measured branch amplitude values of a message element to the predetermined amplitude levels defined by the demodulation reference, selecting the closest match, thereby demodulating the message element. Alternatively, the receiver can calculate the sum-signal amplitude and phase from the branch amplitudes, and compare the sum-signal amplitude and phase to the corresponding predetermined levels. In many cases, demodulation according to the sum-signal amplitude and phase is simpler and more precise and less vulnerable to interference than demodulation based on the branch amplitude levels. This can be seen in the figure, as the phase acceptance regions 218 are shaped as arcs with a narrow range of sum-signal amplitudes and a large range of sum-signal phases. Defining the same shape with the I and Q branch amplitudes, while possible, is time-consuming and cumbersome.

The predetermined levels of the sum-signal amplitude and phase are related to the branch amplitude levels of the modulation scheme. For allowed states in which the I and Q branch amplitudes are equal in magnitude, as shown in the examples herein, the sum-signal amplitude is √2 larger than the branch amplitude levels for each state. To demodulate the message elements of the present examples using sum-signal values, the receiver can either (a) multiply the predetermined branch amplitude levels by √2 for comparison to the sum-signal amplitudes, or (b) divide the sum-signal amplitude by √2 for comparison to the branch amplitude levels, or (c) determine the correct sum-signal amplitude levels directly from the demodulation reference (among other possible ways). It is immaterial how the receiver determines the predetermined sum-signal amplitude levels.

An angular exclusion zone 217, separating each phase acceptance region 218 from its neighbor, is shown at four locations as outlined in dash. A message element that is received with sum-signal amplitude and phase in an exclusion zone 217, would be flagged as ambiguous or as faulted, because the message element could be demodulated according to either of two different allowed states 212. If such phase faults become sufficiently frequent, then the receiver can determine that there is excessive phase noise, and may take steps to switch to a more suitable modulation scheme.

The receiver can also determine whether the received message element has a sum-signal amplitude that is larger or smaller than the phase acceptance regions 218, in which case the receiver can determine that an amplitude fault has occurred in that message element. Thus the receiver can demodulate the message element by separating the raw input signal into I and Q branches, measure the amplitude of each branch, calculate a sum-signal amplitude equal to the vector sum (square root of the sum of the squares) of the two amplitudes, calculate a sum-signal phase equal to the arctangent of the Q amplitude divided by the I amplitude, and determine whether the sum-signal amplitude and phase are within one of the phase acceptance regions, and if so, can demodulate the message element according to the allowed state within that phase acceptance region.

Figure 3A:
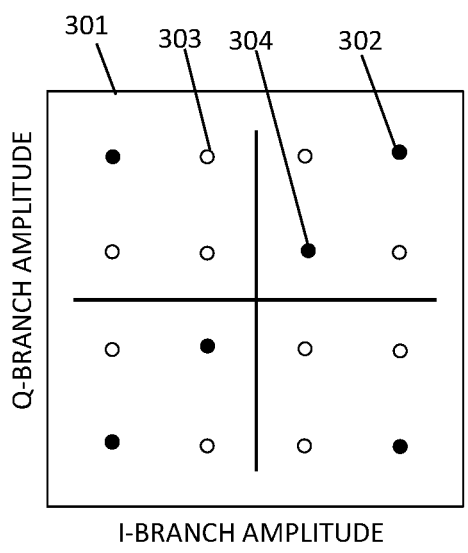
FIG. 3A is a schematic showing an exemplary embodiment of a phase-noise mitigation constellation chart emphasizing a combination of branch equality and maximum amplitude, according to some embodiments.

FIG. 3A is a schematic showing an exemplary embodiment of a phase-noise mitigation constellation chart emphasizing a combination of branch equality and maximum amplitude, according to some embodiments. As depicted in this non-limiting example, an I-Q space constellation chart 301 includes six allowed modulation states 302, 304 among other disallowed states 303. Four allowed states 302 have I and Q amplitudes that are equal in magnitude at the maximum amplitude level, and therefore provide the largest sum-signal amplitude, such as the states of FIG. 2A. Two additional allowed states 304 have smaller branch amplitudes and hence a smaller sum-signal amplitude than the four maximum-amplitude states 302, and have equal amplitude modulation in their I and Q branches (that is, equal in both sign and magnitude). For example, the outer states 302 have (I,Q) combinations of (+3,+3), (+3,−3), (−3,+3), and (−3,−3) units, whereas the two inner states 304 have only (+1,+1) and (−1,−1) units in the (I,Q) branches. Thus the two inner states 304 are equal in both sign and magnitude at a smallest sum-signal amplitude level, whereas the four outer states 302 are equal in magnitude at the largest sum-signal amplitude level. The modulation scheme provides a phase acceptance region of nearly 90 degrees for the four equal-in-magnitude states 302, and an even larger phase acceptance region of nearly 180 degrees for the two equal-sign-and-magnitude states 304. In this way, the modulation scheme can provide six allowed states, thereby delivering over 2.4 bits per message element and a corresponding savings in message size at high frequencies.

Figure 3B:
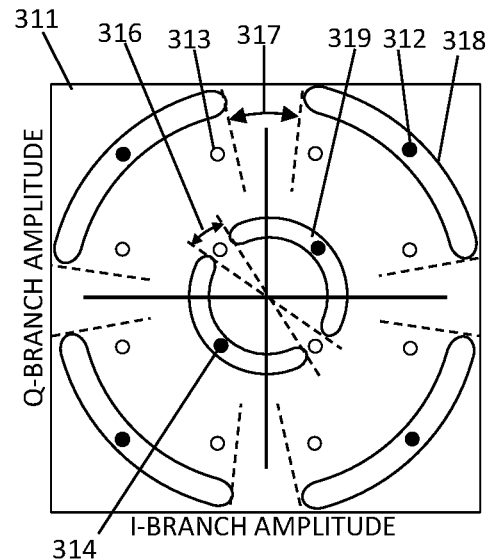
FIG. 3B is a schematic showing an exemplary embodiment of a phase-noise mitigation constellation chart emphasizing a combination of branch equality and maximum amplitude and including phase acceptance regions, according to some embodiments.

FIG. 3B is a schematic showing an exemplary embodiment of a phase-noise mitigation constellation chart emphasizing a combination of branch equality and maximum amplitude, and including phase acceptance regions, according to some embodiments. As depicted in this non-limiting example, an I-Q space constellation chart 311 includes a modulation scheme such as that of FIG. 3A, with six allowed states including four states 312 with I and Q branches modulated at the maximum amplitude level and both branches equal in magnitude, plus two states 314 with the smallest amplitude level and both branches equal in sign and magnitude. Various disallowed states 313 are shown as circles. Each allowed state 312, 314 has a phase acceptance region 318, 319 around it. The states 312 with maximum sum-signal amplitude have an almost 90-degree phase acceptance region 318, while the states 314 with the minimum sum-signal amplitude 314, with equal I and Q modulation, have a nearly 180-degree phase acceptance region 319. The larger phase acceptance regions of the inner states 314 may compensate for their smaller amplitude.

An angular exclusion zone 317 separates the outer phase acceptance regions 318, and a different exclusion zone 316 separates the inner phase acceptance regions 319. By tailoring the phase acceptance region of each allowed state according to the sum-signal amplitude of the state, the modulation scheme can increase the number of allowed states to six, in the depicted case, which provides improved message throughput relative to a modulation scheme with only four allowed states.

Additional allowed states (not shown) can be readily inserted in the space between the outer and inner states 312, 314. Each added state can be provided with a phase acceptance region of nearly 90 degrees or nearly 180 degrees, depending on implementation. The number of additional states that could be inserted in the I-Q space between the depicted states 312, 314 may be limited only by the rate of amplitude faults. For example, four more 90-degree states may be added interior to the four maximum-amplitude states 312, and two more 180-degree states may be added outside the two minimum-amplitude states, for a total of 12 allowed states (3.5 bits per message element), while providing all states with ample phase-acceptance regions. Such a modulation scheme may thereby regain almost all of the information density of prior-art schemes that lack phase-noise mitigation, according to some embodiments.

Figure 3C:
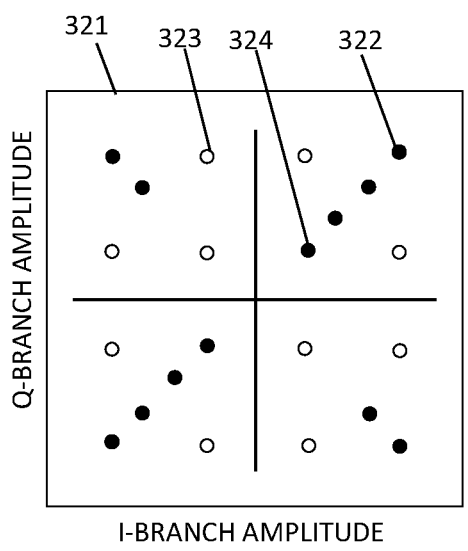
FIG. 3C is a schematic showing an exemplary embodiment of a phase-noise mitigation constellation chart emphasizing a combination of branch equality and maximum amplitude with additional states, according to some embodiments.

FIG. 3C is a schematic showing an exemplary embodiment of a phase-noise mitigation constellation chart emphasizing a combination of branch equality and maximum amplitude with additional states, according to some embodiments. As depicted in this non-limiting example, A constellation chart 321 includes twelve allowed states 322, 324 among disallowed states 323. The allowed states include eight states 322 with I-branch and Q-branch equal in magnitude, and four states 324 with smaller sum-signal amplitudes and with I-branch equal to Q-branch in sign and magnitude. The twelve allowed states 322, 324 of the modulation scheme 321 thereby provide over 3.5 bits per message element, largely negating the loss of information density while retaining a high level of phase-noise tolerance.

Figure 3D:
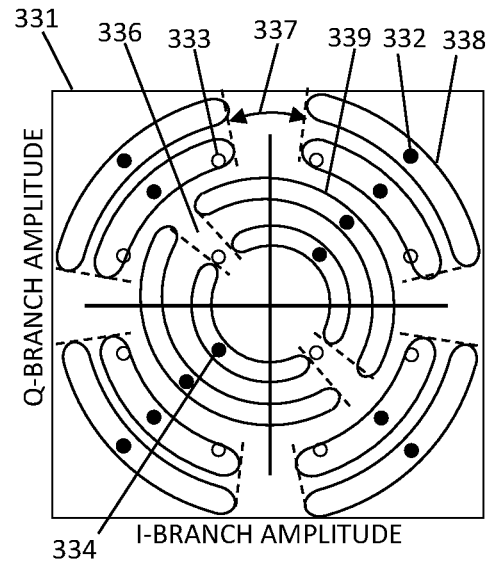
FIG. 3D is a schematic showing an exemplary embodiment of a phase-noise mitigation constellation chart emphasizing a combination of branch equality and maximum amplitude with additional states and including phase acceptance regions, according to some embodiments.

FIG. 3D is a schematic showing an exemplary embodiment of a phase-noise mitigation constellation chart emphasizing a combination of branch equality and maximum amplitude with additional states and including phase acceptance regions, according to some embodiments. As depicted in this non-limiting example, a constellation chart 331 includes the allowed states of the previous figure, including eight outer states 332 with the I-branch equal to the Q-branch in magnitude, and four inner states 334 with the I-branch equal to the Q-branch in magnitude and sign, plus disallowed states 333. Also shown are phase acceptance regions 338, 339 around the allowed states 332, 334 and a variety of exclusion zones 337 between the phase acceptance regions 338, 339.

The allowed states 332, 334 are configured to provide nearly 90 degrees of phase acceptance in the outer states 332, and nearly 180 degrees of phase acceptance in the inner states 334, thereby enabling communications despite substantial phase noise. As mentioned, the 12 allowed states are only four less than the 16 states of prior-art 16QAM, and therefore nearly match the information density while providing much larger phase noise immunity.

Figure 4A:
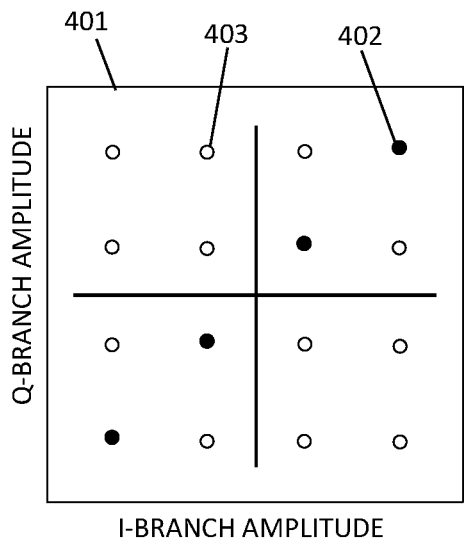
FIG. 4A is a schematic showing an exemplary embodiment of a phase-noise mitigation constellation chart emphasizing branch equality, according to some embodiments.

FIG. 4A is a schematic showing an exemplary embodiment of a phase-noise mitigation constellation chart emphasizing branch equality, according to some embodiments. As depicted in this non-limiting example, an I-Q space constellation chart 401 includes four allowed modulation states 402 (dots) among disallowed states 403 (circles) of 16QAM. The allowed modulation states 402 are amplitude-modulated such that the I and Q branches have equal modulation, that is, the two branches have the same amplitude, in sign and magnitude. States with unequal amplitude modulation in the two branches are all disallowed. The restriction of equal branch amplitudes provides nearly 180 degrees of phase acceptance, which can enable communication at higher frequencies than other modulation schemes can access reliably, due to phase noise.

Figure 4B:
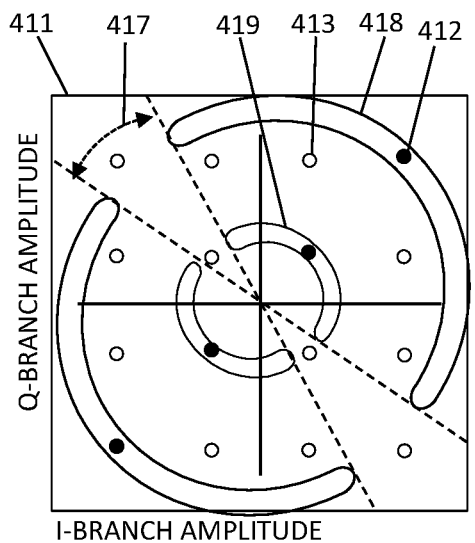
FIG. 4B is a schematic showing an exemplary embodiment of a phase-noise mitigation constellation chart emphasizing branch equality and including phase acceptance regions, according to some embodiments.

FIG. 4B is a schematic showing an exemplary embodiment of a phase-noise mitigation constellation chart emphasizing branch equality and including phase acceptance regions, according to some embodiments. As depicted in this non-limiting example, a constellation chart 411, such as that of FIG. 4A, includes four allowed states 412, each with equal amplitude modulation in the I and Q branches, among disallowed states 413 which have unequal amplitude modulation of the two branches. Phase acceptance regions 418, 419 around each of the four states 412, are shown. Each allowed state 412 has almost 180 degrees of phase acceptance, without encroaching on the angular exclusion zone 417 between the various phase acceptance regions 418, 419.

A receiver can receive messages modulated according to the noise-mitigation modulation scheme 411, and can thereby communicate in a frequency band that may be impractical for other modulation schemes that provide less phase-noise tolerance. In addition, the receiver can diagnose message faults according to the sum-signal amplitude and sum-signal phase of the received message element. For example, if the receiver determines that the sum-signal phase is in the exclusion zone 417, the receiver may conclude that the message element is faulted, likely due to excessive phase noise. When a receiver determines that the sum-signal amplitude is between the two regions 418 and 419, or larger or smaller than those regions, then the receiver may determine that an amplitude fault is present.

After determining the fault type, a receiver can request specific mitigation steps such as switching to a different modulation scheme according to the fault types observed. For example, the receiver can maintain a tally of phase faults and amplitude faults, or can determine a rate of incidence of phase and amplitude faults. If the receiver detects a preponderance of phase faults, the receiver can suggest switching to a second modulation scheme that provides a larger phase acceptance region, such as 360 degrees (as described below), or alternatively switching to a lower frequency until the current high phase-noise environment subsides. If the receiver detects a preponderance of amplitude faults, the receiver can suggest switching to a third modulation scheme with fewer amplitude levels, or more spaced-apart amplitude levels, or a different bandwidth to combat current interference. On the other hand, if the receiver counts few or no faults or each type, it can suggest graduating to a more aggressive modulation scheme with more allowed states and a higher information content in each message element.

Figure 5A:
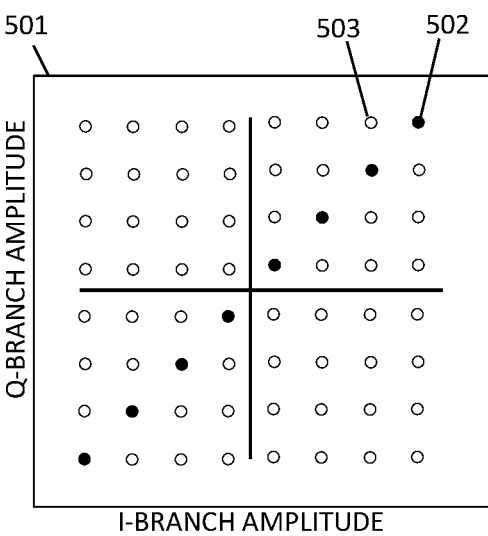
FIG. 5A is a schematic showing an exemplary embodiment of a phase-noise mitigation constellation chart emphasizing branch equality with eight allowed states, according to some embodiments.

FIG. 5A is a schematic showing an exemplary embodiment of a phase-noise mitigation constellation chart in I-Q space, emphasizing branch equality with eight allowed states, according to some embodiments. As depicted in this non-limiting example, a constellation chart 501 includes allowed states 502 among disallowed states 503 of 64QAM. The allowed states 502 all have the same amplitude modulation in the I and Q branches (that is, equal sign and magnitude), and thereby provide eight distinct values of the sum-signal amplitude. Each branch is modulated according to one of eight amplitude levels of the modulation scheme, such as −7, −5, −3, −1, +1, +3, +5, +7 arbitrary units, and thus are equally spaced apart in amplitude. The corresponding sum-signal amplitude values (equal to the root-sum-square of the branch amplitudes) are ±1.4, ±4.2, ±7.1, ±9.9 units, approximately. The sign of the sum-signal amplitude may be set equal to the sign of the branch with the largest magnitude. Alternatively, and equivalently, the sum-signal amplitude sign may be set according to the sum-signal phase. The eight allowed states have 180-degree opposite sum-signal phases, and thus can provide a large phase acceptance region of, for example, 160 degrees phase acceptance, or ±80 degrees of phase-noise tolerance, without affecting the demodulation of the message element (assuming an exclusion zone 517 spanning 20 degrees of sum-signal phase, in two places of the next figure). The modulation scheme can thus provide enhanced phase-noise immunity at high frequencies.

Figure 5B:
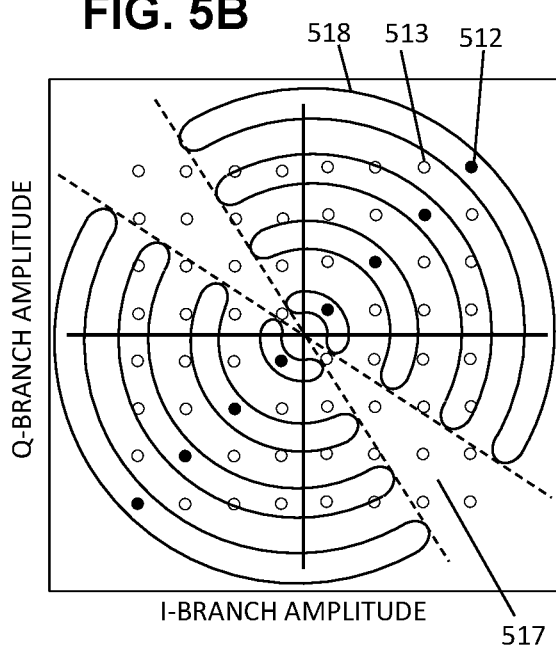
FIG. 5B is a schematic showing an exemplary embodiment of a phase-noise mitigation constellation chart emphasizing branch equality and including phase acceptance regions around eight allowed states, according to some embodiments.

FIG. 5B is a schematic showing an exemplary embodiment of a phase-noise mitigation constellation chart emphasizing branch equality and including phase acceptance regions around 8 allowed states, according to some embodiments. As depicted in this non-limiting example, a constellation chart, such as that of FIG. 5A, includes eight allowed states 512, and various disallowed states 513 which are ignored in the demodulation. Also shown are eight phase acceptance regions 518 around the allowed states 512. Two phase exclusion zones 517 separate the phase acceptance regions 518 from each other. As mentioned, the phase exclusion zones 517 are each 20 degrees wide, and the phase acceptance regions 518 are 160 degrees wide in this case, thereby providing substantial phase-noise immunity.

Operationally, the transmitter can transmit the message element with a modulation corresponding to one of the allowed states 512, by amplitude-modulating the I-branch and the Q-branch according to the same amplitude level, such as one of the predetermined amplitude levels of the modulation scheme. The receiver can receive the raw signal, separate the I and Q branches, measure their amplitudes, calculate the sum-signal amplitude according to the squares of the branch amplitudes, calculate the phase according to the ratio of the branch amplitudes, and thereby determine which of the phase acceptance regions 518 is occupied according to the sum-signal amplitude and phase of the message element. Alternatively, the receiver can determine the sum-signal amplitude and phase by signal processing of the raw received wave directly, instead of separating and processing the I and Q branches. For example, the receiver can digitize the incoming signal (using a fast ADC for example) and digitally select the subcarrier frequency of a message element, then determine the amplitude and phase of that component, which are equivalent to the sum-signal amplitude and phase.

If the sum-signal modulation of the message element does not occupy any of the phase acceptance regions 518, then the receiver can determine that the message element is faulted. To diagnose the problem, the receiver can determine whether the sum-signal phase is in one of the phase exclusion zones 517, in which case the receiver can determine that a phase fault has occurred. If the sum-signal amplitude is between the phase acceptance zones, or below the lowest one, or above the highest one, then the receiver can determine that an amplitude fault has occurred. After finding a predetermined number of faults (or a fault rate), and after determining whether amplitude faults or phase faults are predominant, the receiver can then recommend a different modulation scheme configured to mitigate the types of faults observed. For example, to mitigate phase faults, the receiver can recommend a modulation scheme with even larger phase acceptance regions, as discussed below. To mitigate excessive amplitude faults, the receiver can recommend switching to a scheme with fewer amplitude levels. In addition, if the receiver determines that the number or rate of faults is below a predetermined level, the receiver can recommend using a different modulation scheme that provides more bits per message element. For example, if the receiver sees few or no phase faults, the receiver can recommend switching to one of the other modulation schemes disclosed herein, or to regular 16QAM if the phase noise is especially low.

Figure 6A:
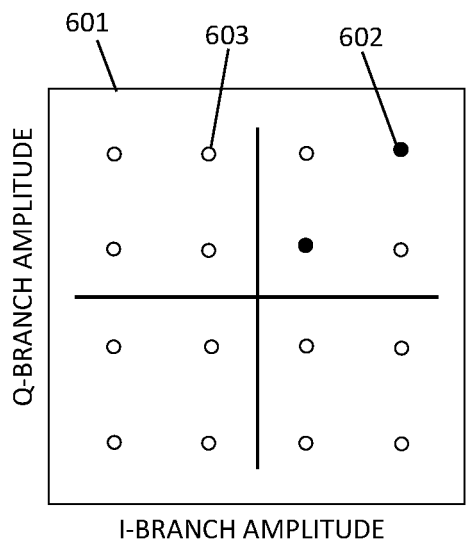
FIG. 6A is a schematic showing an exemplary embodiment of a phase-noise mitigation constellation chart with maximal phase noise tolerance, according to some embodiments.

FIG. 6A is a schematic showing an exemplary embodiment of a phase-noise mitigation constellation chart in I-Q space, with maximal phase-noise tolerance, according to some embodiments. As depicted in this non-limiting example, a constellation chart 601 includes two allowed modulation states 602 among disallowed states 603 of 16QAM. The two allowed states 602 have the same amplitude modulation on the I and Q branches, and both branch amplitudes are positive, in the depicted case. In other words, the transmitter modulates each message element to have the same positive amplitude in both I and Q branches before transmission. The receiver can then demodulate the message element by calculating the sum-signal amplitude and comparing to a set of predetermined sum-signal levels of the modulation scheme. (Other choices are possible for the allowed states and are equivalent, so long as each allowed state has a different sum-signal amplitude.)

Operationally, the receiver can receive a message element in the normal way, by separating the I and Q branches and measuring the amplitude of each branch. Then the receiver can calculate the sum-signal amplitude of the message element by calculating the vector sum (square root of the sum of the squares) of the two branch amplitudes. The receiver can then compare the sum-signal amplitude to the predetermined sum-signal amplitude levels of the modulation scheme, select the closest level, and thereby demodulate the message element. The corresponding allowed state is unaffected by phase noise, since the phase acceptance region spans a full 360 degrees. Hence the depicted modulation scheme may enable messaging at frequencies inaccessible to other modulation schemes that rely on phase determination of the received signal.

Figure 6B:
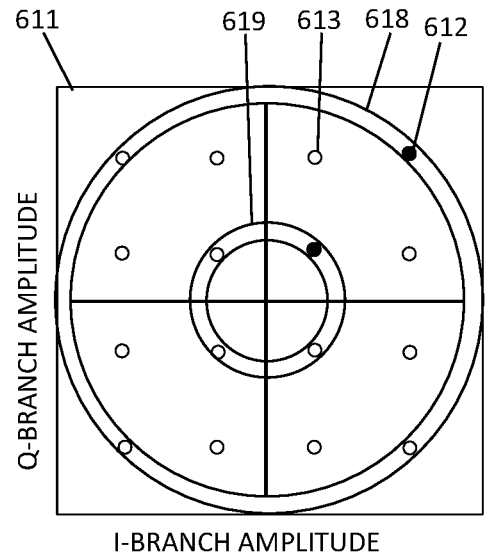
FIG. 6B is a schematic showing an exemplary embodiment of a phase-noise mitigation constellation chart with maximal phase noise tolerance including phase acceptance regions, according to some embodiments.

FIG. 6B is a schematic showing an exemplary embodiment of a phase-noise mitigation constellation chart with maximal phase acceptance, including the phase acceptance regions, according to some embodiments. As depicted in this non-limiting example, a constellation chart 611 representing an I-Q space includes two allowed states 612, such as those of FIG. 6A, among disallowed states 613. Also shown are phase acceptance regions 618 and 619. In this case, phase noise of up to 360 degrees can be tolerated without altering the demodulated state of the message element. Despite extreme phase noise, the receiver can nevertheless determine the intended state of the message element, unambiguously, by calculating the magnitude of the sum-signal amplitude of the message element and comparing to a set of predetermined sum-signal amplitude levels of the modulation scheme.

Phase-noise immunity is provided, in this example, by configuring the modulation scheme to include only states that have I and Q branch amplitudes with equal, positive amplitudes, such as (I,Q)=(+1,+1) and (+3,+3) for the two allowed states 612. In other embodiments, the branch amplitudes may be equal in magnitude but need not be equal in sign, so long as the magnitudes of the sum-signal amplitudes of the allowed states are all distinct. For example, allowed states with (I,Q)=(−1,+1) and (+3,−3) would work as well since the magnitudes of the sum-signal amplitudes are distinct. Since the depicted states are immune to phase noise that leaves the sum-signal amplitude unchanged, the modulation scheme can enable communication at frequencies inaccessible to modulation schemes that rely on accurate phase determination of the received signal.

Figure 7A:
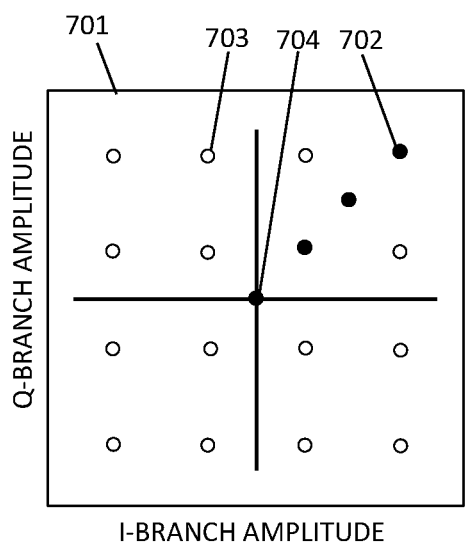
FIG. 7A is a schematic showing an exemplary embodiment of a phase-noise mitigation constellation chart with maximal phase noise tolerance and multiple amplitude levels, according to some embodiments.

FIG. 7A is a schematic showing an exemplary embodiment of a phase-noise mitigation constellation chart with maximal phase acceptance and multiple amplitude levels, according to some embodiments. As depicted in this non-limiting example, a constellation chart 701 includes four allowed states 702, among disallowed states 703 of 16QAM. The allowed states 702 are transmitted with the same amplitude modulation in the I and Q branches, according to four amplitude levels. The additional modulation states provide more bits per message element than the previous example.

As an option, the two branches may have the same amplitude in magnitude, such as any combination of +3 and −3 arbitrary units in both branches. In yet another embodiment, all the transmitted energy may be placed in one of the branches, such as +3√2 arbitrary units in the I branch and zero in the Q branch, or vice-versa. The signs of the branch amplitudes are immaterial, so long as each allowed state has a distinct sum-signal amplitude, not overlapping with any other allowed state. Since the modulation state is determined by the sum-signal amplitude in this example, the sum-signal phase is irrelevant.

In the depicted embodiment, one of the allowed states 704 has zero amplitude in both I and Q branches, and is therefore a "zero-power" modulation state. The depicted states include I and Q branches with equal amplitude modulation (that is, equal sign and magnitude) and provide integer Namp equally-spaced non-negative predetermined amplitude levels, such as 0, 1, 2, and 3 arbitrary units. The receiver can then demodulate the message element by measuring the received amplitudes of the I and Q branches, calculating the sum-signal amplitude, and comparing to the predetermined sum-signal amplitude levels of the modulation scheme. In this case, the receiver can compare the calculated sum-signal amplitude to four predetermined sum-signal amplitude levels of the modulation scheme, and can thereby determine which of the allowed states 702, 704 was transmitted. Since the allowed states 702, 704 have 360-degree phase acceptance for each allowed state, the demodulation is unaffected by phase noise of any intensity, according to the assumptions stated above.

In another embodiment, the zero-power state 704 may be replaced by a fourth state with non-zero amplitude. The four positive amplitude levels may be, for example, 1, 1.67, 2.33, and 3 arbitrary units of amplitude, or equivalently 1, 2, 3, and 4 units of amplitude, thereby providing two bits per message element. Yet more amplitude levels can be added, so long as the radial spacing between the sum-signal amplitude levels is sufficient to prevent amplitude faults. For example, there may be eight amplitude levels with 0, 1, 2, 3, 4, 5, 6, and 7 arbitrary units of amplitude (or 1, 2, 3, 4, 5, 6, 7, 8 arbitrary units if the zero-power state is avoided). Such a scheme would thereby provide 3 bits of information per message element. If 16 positive amplitude levels could be accommodated, with acceptable amplitude fault rates, then 4 bits per message element could be transmitted, and so forth for higher values of Namp.

Figure 7B:
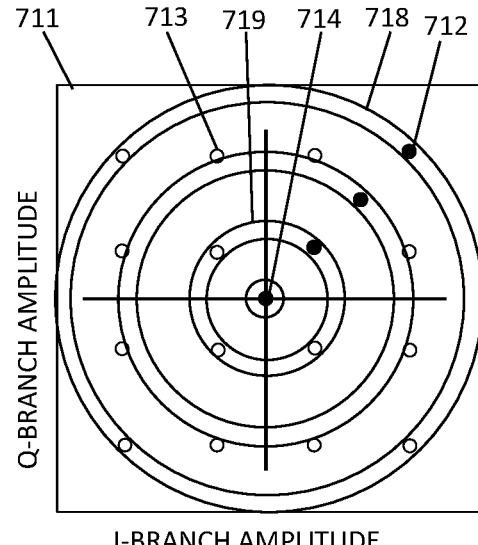
FIG. 7B is a schematic showing an exemplary embodiment of a phase-noise mitigation constellation chart with maximal phase noise tolerance including phase acceptance regions and multiple amplitude levels, according to some embodiments.

FIG. 7B is a schematic showing an exemplary embodiment of a phase-noise mitigation constellation chart with maximal phase acceptance, including phase acceptance regions and multiple amplitude levels, according to some embodiments. As depicted in this non-limiting example, a constellation chart 711, such as that of FIG. 7A, includes four allowed states 712, including a zero-power state 714, among disallowed states 713. Phase acceptance regions 718, 719 show how each allowed state 712, 714 may be demodulated according to the sum-signal amplitude, despite being distorted by extreme phase noise, including 360-degree phase distortions. The receiver can demodulate the message element by calculating a sum-signal amplitude from the measured I and Q branch amplitudes and determine the correct allowed state of the message element based on the sum-signal amplitude, regardless of the phase noise including the extreme 360-degree phase noise as depicted.

Figure 8A:
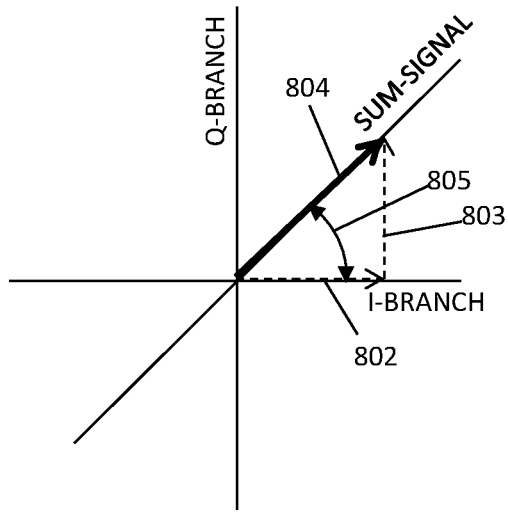
FIG. 8A is a polar plot showing an exemplary embodiment of a quadrature modulation scheme with sum-signal analysis, according to some embodiments.

FIG. 8A is a polar plot showing an exemplary embodiment of a quadrature modulation scheme with sum-signal analysis, according to some embodiments. As depicted in this non-limiting example, a receiver separates a received waveform into an I-branch signal 802 and an orthogonal Q-branch signal 803. (For simplicity, carrier suppression is ignored.) The receiver can separate the I and Q branches upon reception, and can measure the branch amplitudes for each message element. The receiver can then calculate the sum-signal amplitude 804 and the sum-signal phase 805 by trigonometrically combining the I-branch and Q-branch signals 802, 803 as shown. The sum-signal amplitude 804 is the hypotenuse of a triangle.

Figure 8B:
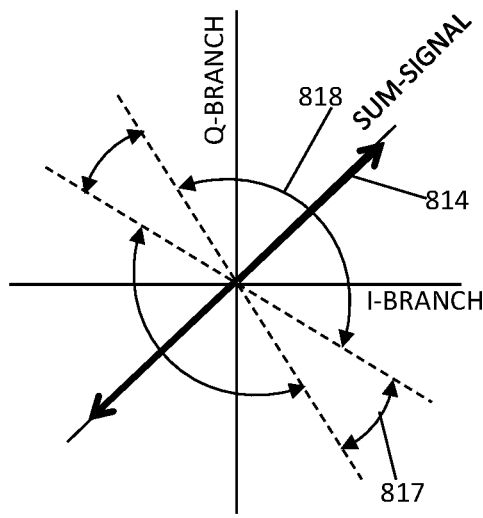
FIG. 8B is a polar plot showing an exemplary embodiment of a quadrature modulation scheme with phase-noise mitigation, according to some embodiments.

FIG. 8B is a polar plot showing an exemplary embodiment of a quadrature modulation scheme with phase-noise mitigation, according to some embodiments. As depicted in this non-limiting example, two sum-signals 814 are shown as arrows, representing two modulation states with opposite amplitudes (or equivalently, separated by 180 degrees in phase), such as two of the opposite states depicted in FIG. 3A. For example, the receiver can combine the I-branch and Q-branch signals as indicated in FIG. 8A, and can thereby determine the two sum-signals 814 as the vector sum or the root-sum-squares of the two branch signals. Also shown are arcs 818 indicating the phase acceptance, such that any message element with a sum-signal amplitude as shown, and a sum-signal phase within one of the phase acceptance arcs 818, will be demodulated as the associated allowed state.

Also shown are two exclusion zones 817. The receiver can unambiguously demodulate the sum-signal amplitudes as long the sum-signal 814 remains in the phase acceptance ranges indicated 818. However, if the phase noise is strong enough to rotate the sum-signal 814 into the exclusion zones 817, then the message element may be declared ambiguous or faulted.

Figure 8C:
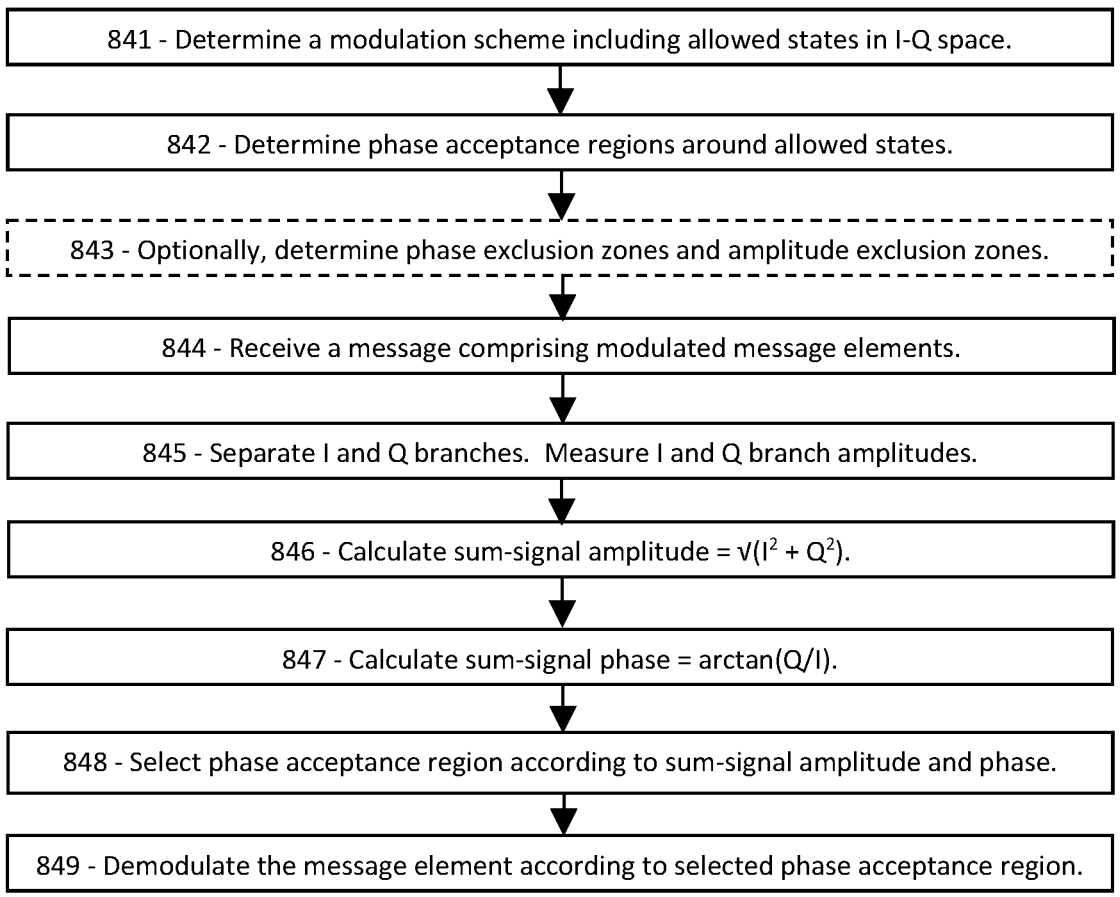
FIG. 8C is a flowchart showing an exemplary embodiment of a procedure for demodulating a message with phase-noise mitigation, according to some embodiments.

FIG. 8C is a flowchart showing an exemplary embodiment of a procedure for demodulating a message with phase-noise mitigation, according to some embodiments. As depicted in this non-limiting example, at 841 a receiver of a wireless entity determines a modulation scheme including a plurality of allowed states in an I-Q space defined by amplitudes of orthogonal signal components or branches. For phase-noise mitigation, the allowed states may be restricted to states in which the I-branch amplitude and the Q-branch amplitude are equal in magnitude, and optionally equal in sign as well, and optionally restricted to all positive values, depending on the degree of phase-noise mitigation required. Additional states, beyond those of prior-art schemes such as QAM schemes, may be added to increase the information density in the transmission, without sacrificing the phase-noise mitigation.

At 842, the receiver can determine, around each of the allowed states, a phase acceptance region of the I-Q space, in which any message element with modulation within one of the phase acceptance regions will be demodulated as the associated allowed state. At 843, optionally (in dash), the receiver can determine one or more phase or amplitude exclusion zones of the I-Q space, such that any message element with modulation in one of the exclusion zones would cause the receiver to flag the message element as faulted. Optionally, the receiver may tally the number of phase and amplitude faults according to which of the exclusion zones is occupied.

At 844, the receiver can receive a message including a plurality of message elements modulated according to the modulation scheme. At 845, the receiver can separate the I and Q branch signals of each message element and measure the I and Q branch amplitudes.

At 846, the receiver can calculate sum-signal parameters from the branch parameters, specifically the sum-signal amplitude as the root-sum-square of the branch amplitudes, and at 847 the sum-signal phase as the angle whose tangent equals the ratio of the Q-branch amplitude to the I-branch amplitude. Although the demodulation can be performed using the I and Q branch amplitudes, at high frequencies the signal processing is simpler and more efficient using the sum-signal amplitude and sum-signal phase to select the allowed state of each message element.

At 848, the receiver can determine which phase acceptance region is occupied by the message element, according to the sum-signal amplitude and phase, and at 849 can demodulate the message element according to the allowed state associated with that phase acceptance region. Although one or more of the disallowed states may also be found within the phase acceptance region, they are irrelevant to the analysis and are not to be confused with the allowed states. The allowed states disclosed herein obtain special phase-noise mitigation by configuring the positions of the allowed states on the I-Q plane to have large phase acceptance regions. This is obtained by configuring allowed states to have their I and Q amplitudes equal in magnitude, and optionally equal in sign, and optionally in the same quadrant as well.

FIG. 9A is a flowchart showing an exemplary embodiment of a procedure for transmitting a message with phase-noise mitigation, according to some embodiments. As depicted in this non-limiting example, at 901 a transmitter can determine a modulation scheme with two orthogonal phase levels (such as an I-branch and a Q-branch at 90 degrees) and a number of branch amplitude levels. At 902, the transmitter can prepare a message for transmission by modulating each message element according to the phase levels and branch amplitude levels of the modulation scheme. In this case, unlike prior art, the I and Q branches are both modulated according to the same branch amplitude level, including sign and magnitude. Causing the two branches to have the same amplitude can thereby provide a nearly 180-degree phase acceptance region for each allowed state of the modulation scheme. At 903, the transmitter transmits the message.

FIG. 9B is a flowchart showing an exemplary embodiment of a procedure for receiving a message with phase-noise mitigation, according to some embodiments. As depicted in this non-limiting example, at 921 a receiver can receive a message modulated as described in FIG. 9A. At 922, the receiver can separate the I and Q branch signals of each message element, and can measure their branch amplitudes. Due to phase-noise mixing of the two branches, these amplitude values may be quite different from the branch amplitudes imposed by the transmitter, yet the sum-signal amplitude can remain substantially unchanged. Therefore, at 923, the receiver calculates the sum-signal amplitude equal to the square root of the sum of the squares of the two branch amplitudes. At 924, the receiver determines which of the received I and Q branches had a larger magnitude, and sets the sign of the sum-signal amplitude equal to the sign of that larger branch amplitude. (Alternatively, the receiver can calculate the sum-signal phase as the arctangent of Q/I). At 925, the receiver then compares the sum-signal amplitude to the predetermined sum-signal amplitude levels of the modulation scheme (determined from a demodulation reference, for example) and thereby determines the original content of the message element.

FIG. 9C is a flowchart showing an exemplary embodiment of a procedure for determining whether a message with phase-noise mitigation is faulted, according to some embodiments. As depicted in this non-limiting example, at 941 a receiver calculates a sum-signal phase according to a ratio of the received I and Q branch amplitudes, and a sum-signal amplitude according to a vector sum of the two branch signals. At 942, the receiver determines whether the sum-signal phase is in an excluded phase zone, such as a region of phase between the phase acceptance regions of adjacent modulation states. If the sum-signal phase is in one of the excluded phase zones, the receiver determines at 945 that the message element has a phase fault. If the phase is within an allowed phase region, then at 943 the receiver determines whether the amplitude is in an excluded amplitude zone. For example, the receiver can determine whether the sum-signal amplitude is in a region of amplitude between the predetermined sum-signal amplitude levels, or larger than the largest predetermined amplitude level, or smaller than the smallest predetermined amplitude level. If so, then the message element has an amplitude fault. If not, then the receiver determines at 944 that the message element is demodulated correctly and proceeds to the next message element.

Optionally, the receiver can record the number of phase faults detected and the number of amplitude faults detected, and optionally the number of message elements containing both amplitude and phase faults, according to the sum-signal amplitude and phase. Then the receiver, or other entity, can determine whether it would be beneficial to switch to a different modulation scheme.

The flowchart is specific to a modulation scheme such as that of FIG. 5A. In other embodiments, the steps can be readily modified to select only the maximum-amplitude states as the allowed states, and thereby provide four allowed states with nearly 90 degrees of phase allowance as in FIG. 2A. Alternatively, the flowchart can be modified to select states having the same positive I and Q amplitudes, as shown in FIG. 6A or FIG. 7A, and can thereby obtain 360-degree phase immunity.

Figure 10:
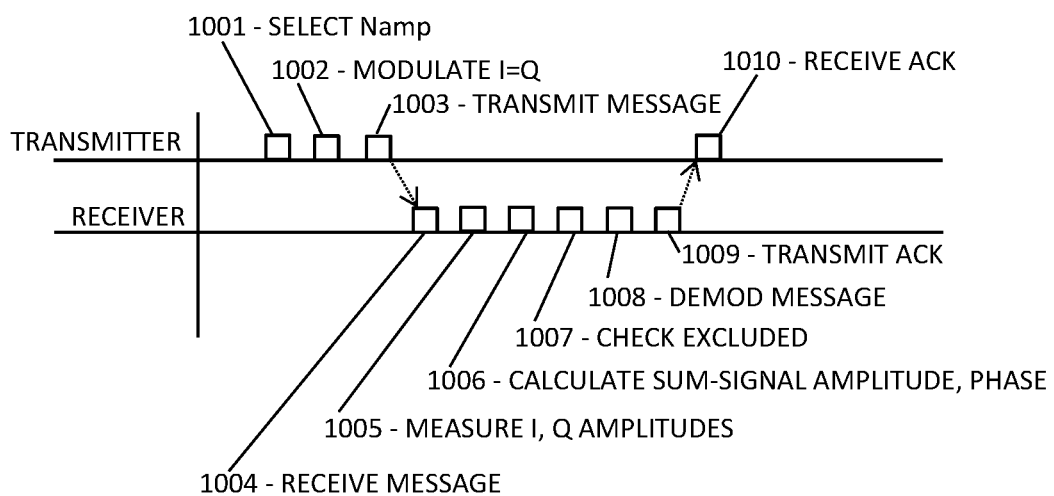
FIG. 10 is a sequence chart showing an exemplary embodiment of a procedure for transmitting and receiving a message with phase-noise mitigation, according to some embodiments.

FIG. 10 is a sequence chart showing an exemplary embodiment of a procedure for transmitting and receiving a message with phase-noise mitigation, according to some embodiments. As depicted in this non-limiting example, actions of a transmitter are shown on the first line, actions of a receiver are shown on a second line, time is horizontal, and arrows indicate causality. At 1001, a transmitter selects, or otherwise determines, a modulation scheme with Namp branch amplitude levels. The Namp branch amplitude levels may have all the same sign, such as positive amplitudes, or they may include an equal number of positive and negative amplitudes, and may include a zero amplitude, depending on implementation. At 1002, the transmitter modulates each message element of a message according to orthogonal I and Q branches, but in this case the transmitter modulates the two branches according to the same amplitude, that is, the I and Q branches are transmitted with the same predetermined amplitude level of the modulation scheme. Then at 1003, the transmitter transmits the message, which a receiver receives at 1004.

The receiver then separates the I and Q branches by quadrature decomposition, or otherwise, and measures their branch amplitudes at 1005. At 1006, the receiver calculates a sum-signal amplitude and phase. For example, the receiver can calculate the sum-signal phase according to a ratio of the received I and Q amplitudes, and can calculate the sum-signal amplitude according to a vector sum of the measured branch amplitudes. At 1007, the receiver checks whether the sum-signal amplitude or phase is in an exclusion zone, which would indicate that the message may be faulted. At 1008, the receiver compares the sum-signal amplitude to a set of predetermined sum-signal amplitude levels of the modulation scheme and determines which of the predetermined sum-signal amplitude levels is closest, thereby demodulating the message element. In some embodiments, the receiver may also determine whether the branch signal with a larger magnitude is positive or negative, and may prepend the same sign to the sum-signal amplitude. After demodulating the rest of the message elements in the same way, at 1009 the receiver transmits an acknowledgement message to the transmitter, indicating whether the message was faulted. At 1010 the transmitter receives the acknowledgement and, if requested, may retransmit the message.

The examples disclose procedures for modulating and demodulating messages with large phase acceptance regions around each allowed state of the modulation scheme. In some embodiments, the allowed modulation states are selected from states of a prior-art QAM constellation chart, and configured to provide greater phase acceptance than prior-art modulation schemes by selecting, as the allowed states, only those with equal amplitude modulation in the two branches, or alternatively with amplitudes equal in magnitude, or alternatively only the equal and positive amplitude levels, depending on the amount of phase-noise mitigation required. For example, the allowed states may be those with the maximum sum-signal amplitudes and the disallowed states may be all the others of a QAM modulation scheme, thereby providing nearly 90 degrees of phase acceptance for each allowed state. In other examples, the I and Q branches may be amplitude-modulated at the same positive or negative amplitude level, thereby providing a nearly 180 degree phase-noise tolerance. In further examples, extreme phase acceptance of 360 degrees may be provided by modulating the I and Q amplitudes to the same positive-only amplitude levels. Additional allowed states may be provided by adding more amplitude levels. One of the allowed states may have zero amplitude in both branches.

A receiver can diagnose demodulation problems according to the types of faults observed in messages. For example, the receiver can count the number of message elements in which the sum-signal phase is within a phase exclusion zone, and can count the number of message elements in which the sum-signal amplitude is in an amplitude exclusion zone (such as a region of the I-Q space between the phase acceptance regions of two allowed states with different sum-signal amplitudes), and may thereby determine whether the predominant faulting source is phase noise or amplitude noise. In addition, the receiver can compare a faulted message to a subsequently received unfaulted copy, and can thereby determine which message elements were faulted and specifically how they were faulted, by phase or amplitude distortion. The receiver or the transmitter, or a core network, can then analyze those faults and determine whether a different modulation scheme would be beneficial. For example, if the modulation scheme provides four states separated by 90 degrees, as in FIG. 2B, and the receiver determines that the number of phase errors exceeds the number of amplitude errors, then the transmitter could change to a different scheme, such as that of FIG. 3B with four amplitude levels and 180-degree phase separation between states, thereby mitigating the predominant source of faulting.

Selecting a modulation scheme to provide enhanced phase acceptance may enable communication at high frequencies that prior-art modulation schemes cannot reach without unacceptable fault rates. Modulation schemes such as those disclosed may be necessary to obtain the enormous increase in bandwidth potentially available at multi-tens and multi-hundreds of GHz, thereby providing enhanced speed and reliability to communications in the coming decades.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a wireless receiver to demodulate a message, the method comprising:
   a. using a first modulation scheme comprising two multiplexed modulation parameters and integer Nstate allowed modulation states, each allowed modulation state comprising a predetermined combination of the two multiplexed modulation parameters;
   b. determining one or more acceptance regions comprising combinations of the two multiplexed modulation parameters, wherein each acceptance region contains exactly one of the allowed modulation states;
   c. receiving a message comprising message elements, each message element comprising a raw signal;
   d. demodulating each message element according to the first modulation scheme;
   e. determining whether the message element, as demodulated, is within one of the acceptance regions;
   f. when the message element, as demodulated, is within a particular acceptance region, assigning the message element to the allowed modulation state contained in the particular acceptance region; and
   g. when the message element, as demodulated, is not within any of the acceptance regions, determining that the message element is faulted.

2. The method of claim 1, wherein the message is configured according to 5G or 6G technology.

3. The method of claim 1, wherein:
   a. the two multiplexed modulation parameters comprise an I-branch signal and an orthogonal Q-branch signal, such that the raw signal comprises a sum of the I-branch signal and the Q-branch signal; and
   b. each allowed state comprises a predetermined value of an amplitude of the I-branch signal and a predetermined value of an amplitude of the Q-branch signal.

4. The method of claim 1, wherein:
   a. the two modulation parameters comprise a raw amplitude and a raw phase, such that the raw signal of each message element comprises a raw amplitude multiplexed with a raw phase; and
   b. each allowed state comprises a predetermined value of the raw amplitude and a predetermined value of the raw phase.

5. The method of claim 4, further comprising:
   a. determining one or more phase exclusion zones comprising combinations of the two multiplexed modulation parameters, wherein each phase exclusion zone comprises a raw phase region between two of the acceptance regions, and avoids overlapping all of the acceptance regions and all of the allowed modulation states.

6. The method of claim 5, further comprising:
   a. determining one or more amplitude exclusion zones comprising combinations of the two multiplexed modulation parameters, wherein each amplitude exclusion zone comprises a raw amplitude region between two of the acceptance regions, and avoids overlapping all of the acceptance regions and all of the allowed modulation states.

7. The method of claim 6, further comprising:
   a. determining a number or rate of amplitude faults, wherein an amplitude fault comprises a message element that, as demodulated, is within one of the amplitude exclusion zones;
   b. determining a number or rate of phase faults, wherein a phase fault comprises a message element that, as demodulated, is within one of the phase exclusion zones;
   c. upon determining that the number or rate of amplitude faults exceeds a predetermined threshold, selecting a second modulation scheme, wherein the second modulation scheme comprises a larger amplitude step than the first modulation scheme, wherein the amplitude step comprises a separation between the predetermined values of the raw amplitudes; and
   d. upon determining that the number or rate of phase faults exceeds a predetermined threshold, selecting a third modulation scheme, wherein the third modulation scheme comprises a larger phase step than the first modulation scheme, wherein the phase step comprises a separation between the predetermined values of the raw phases.

8. A method for a wireless transmitter to transmit a message, the method comprising:
   a. using a modulation scheme comprising integer Nstate allowed modulation states, each allowed modulation state comprising amplitude modulation multiplexed with phase modulation, wherein the amplitude modulation comprises integer Namp predetermined amplitude levels and the phase modulation comprises integer Nphase predetermined phase levels;
   b. wherein the Namp predetermined amplitude levels are equally spaced apart according to an amplitude step, and the Nphase predetermined phase levels are equally spaced apart according to a phase step;
   c. modulating each message element of a message according to the modulation scheme; and
   d. transmitting the message, wherein one allowed modulation state comprises zero power transmission.

9. A method for a wireless transmitter to transmit a message, the method comprising:
   a. using a modulation scheme comprising integer Nstate allowed modulation states, each allowed modulation state comprising amplitude modulation multiplexed with phase modulation, wherein the amplitude modulation comprises integer Namp predetermined amplitude levels and the phase modulation comprises integer Nphase predetermined phase levels;
   b. wherein the Namp predetermined amplitude levels are equally spaced apart according to an amplitude step, and the Nphase predetermined phase levels are equally spaced apart according to a phase step;
   c. modulating each message element of a message according to the modulation scheme; and
   d. transmitting the message, wherein:
      i. Nphase equals 1;
      ii. Namp is greater than 1; and
      iii. Nstate equals Namp.

10. A method for a wireless transmitter to transmit a message, the method comprising:
   a. using a modulation scheme comprising integer Nstate allowed modulation states, each allowed modulation state comprising amplitude modulation multiplexed with phase modulation, wherein the amplitude modulation comprises integer Namp predetermined amplitude levels and the phase modulation comprises integer Nphase predetermined phase levels;
b. wherein the Namp predetermined amplitude levels are equally spaced apart according to an amplitude step, and the Nphase predetermined phase levels are equally spaced apart according to a phase step;
c. modulating each message element of a message according to the modulation scheme; and
d. transmitting the message, wherein:
  i. Nphase equals 4;
  ii. Namp equals 2;
  iii. Nstate equal 6;
  iv. two of the allowed states are separated from equal-amplitude neighbors by 180 degrees in phase; and
  v. four of the allowed states are separated from equal-amplitude neighbors by 90 degrees in phase.

11. A method for a wireless transmitter to transmit a message, the method comprising:
a. using a modulation scheme comprising integer Nstate allowed modulation states, each allowed modulation state comprising amplitude modulation multiplexed with phase modulation, wherein the amplitude modulation comprises integer Namp predetermined amplitude levels and the phase modulation comprises integer Nphase predetermined phase levels;
b. wherein the Namp predetermined amplitude levels are equally spaced apart according to an amplitude step, and the Nphase predetermined phase levels are equally spaced apart according to a phase step;
c. modulating each message element of a message according to the modulation scheme; and
d. transmitting the message, wherein:
  i. Nphase equals 4;
  ii. Namp equals 4;
  iii. Nstate equals 12;
  iv. four of the allowed states are separated from equal-amplitude neighbors by 180 degrees in phase; and
  v. eight of the allowed states are separated from equal-amplitude neighbors by 90 degrees in phase.

12. A method for a wireless transmitter to transmit a message, the method comprising:
a. using a modulation scheme comprising integer Nstate allowed modulation states, each allowed modulation state comprising amplitude modulation multiplexed with phase modulation, wherein the amplitude modulation comprises integer Namp predetermined amplitude levels and the phase modulation comprises integer Nphase predetermined phase levels;
b. wherein the Namp predetermined amplitude levels are equally spaced apart according to an amplitude step, and the Nphase predetermined phase levels are equally spaced apart according to a phase step;
c. modulating each message element of a message according to the modulation scheme; and
d. transmitting the message, wherein:
  i. Nphase equals 2;
  ii. Namp equals 2;
  iii. Nstate equals 4; and
  iv. all of the allowed states are separated from equal-amplitude neighbors by 180 degrees in phase.

13. A method for a wireless transmitter to transmit a message, the method comprising:
a. using a modulation scheme comprising integer Nstate allowed modulation states, each allowed modulation state comprising amplitude modulation multiplexed with phase modulation, wherein the amplitude modulation comprises integer Namp predetermined amplitude levels and the phase modulation comprises integer Nphase predetermined phase levels;
b. wherein the Namp predetermined amplitude levels are equally spaced apart according to an amplitude step, and the Nphase predetermined phase levels are equally spaced apart according to a phase step;
c. modulating each message element of a message according to the modulation scheme; and
d. transmitting the message, wherein:
  i. Nphase equals 2;
  ii. Namp equals 4;
  iii. Nstate equals 8; and
  iv. all of the allowed states are separated from equal-amplitude neighbors by 180 degrees in phase.

14. Non-transitory computer-readable media in a wireless receiver, the media containing instructions that when implemented in a computing environment cause a method to be performed, the method comprising:
a. receiving a wireless message comprising message elements, each message element modulated according to a first modulation scheme, the first modulation scheme comprising a first plurality of modulation states, wherein each modulation state of the first plurality comprises a first modulation parameter multiplexed with a second modulation parameter;
b. for each message element, demodulating the message element according to a second modulation scheme comprising a second plurality of modulation states, wherein each modulation state of the second plurality comprises a third modulation parameter multiplexed with a fourth modulation parameter, wherein the third and fourth modulation parameters differ from the first and second modulation parameters;
c. for each message element, converting the third and the fourth modulation parameters into the first and second modulation parameters, according to an algorithm; and then
d. demodulating each message element by determining which modulation state of the first plurality comprises modulation parameters that are closest to the first and second modulation parameters of the message element.

15. The non-transitory computer-readable media of claim 14, wherein:
a. the first modulation scheme comprises amplitude modulation multiplexed with phase modulation;
b. the second modulation scheme comprises two amplitude modulated branch signals comprising an I-branch signal multiplexed with an orthogonal Q-branch signal; and
c. wherein the I-branch signal comprises an I-branch amplitude and the Q-branch signal comprises a Q-branch amplitude.

16. The non-transitory computer-readable media of claim 15, wherein:
a. the algorithm comprises calculating, for each message element, a sum-signal amplitude comprising a square root of a sum of the I-branch amplitude squared plus the Q-branch amplitude squared; and
b. the algorithm further comprises calculating, for each message element, a sum-signal phase comprising an arctangent of the Q-branch amplitude divided by the I-branch amplitude.

17. The non-transitory computer-readable media of claim 16, wherein:

a. the demodulating each message element comprises determining, according to a demodulation reference proximate to the message, one or more predetermined amplitude levels and one or more predetermined phase levels of the first modulation scheme;
b. for each message element, determining which of the predetermined amplitude levels is closest to the sum-signal amplitude of the message element; and
c. for each message element, determining which of the predetermined phase levels is closest to the sum-signal phase of the message element.

18. The non-transitory computer-readable media of claim 14, wherein:
a. one modulation state of the first plurality comprises zero power transmission; and
b. one modulation state of the second plurality comprises zero power transmission.

* * * * *